United States Patent [19]
Del Bono

[11] 3,818,570
[45] June 25, 1974

[54] ARMATURE WINDING MACHINE WITH IMPROVED LEAD STAKING MEANS

[75] Inventor: Mario Del Bono, Florence, Italy
[73] Assignee: Possis Corporation, Minneapolis, Minn.
[22] Filed: May 2, 1973
[21] Appl. No.: 356,345

[30] Foreign Application Priority Data
May 17, 1972 Italy................................ 9485/72

[52] U.S. Cl............................................. 29/205 C
[51] Int. Cl............................................. H02k 15/06
[58] Field of Search....... 29/205 C, 205 R, 596, 598

[56] References Cited
UNITED STATES PATENTS

| | | | |
|---|---|---|---|
| 3,002,259 | 10/1961 | Fletcher et al.................... | 29/205 C |
| 3,142,890 | 8/1964 | Adams et al...................... | 29/598 X |
| 3,169,301 | 2/1965 | Fletcher et al.................... | 29/205 C |
| 3,395,449 | 8/1968 | Moore ................................ | 29/596 |

Primary Examiner—Thomas H. Eager

[57] ABSTRACT

An armature winding machine of the type wherein the ending and starting leads of the coils successively wound onto the core by a pair of oppositely rotating flyers, are attached to the segments or bars of the commutator of the armature by stuffing them into slots cut into the bars, which machine is characterized by the provision of automatically functioning means to assure exact alignment between the lead tucking blades of the lead attaching instrumentalities and the commutator slots before the leads are driven into the slots, this being accomplished by optical sensing means which takes cognizance of the position of the commutator slot with respect to the lead attaching instrumentalities, produces a signal indicative of that relationship and initiates the operation of corrective drive means by which the lead attaching instrumentalities are brought into exact alignment with the mouth of the slot.

13 Claims, 21 Drawing Figures

ARMATURE WINDING MACHINE WITH IMPROVED LEAD STAKING MEANS

This invention relates to armature winding machines by which coils of wire are successively wound into angularly spaced pairs of slots in the core of an armature core assembly which consists of a longitudinally slotted laminated core and a commutator mounted on a common shaft, and refers more particularly to such winding machines that are equipped to connect the beginning and ending leads of the successively wound coils to their respective commutator bars by forcing the leads into slots cut into the bars — as distinguished from attaching them to tangs or hooks that project from the commutator bars. Hence, this invention is classifiable with the Fletcher et al U.S. Pat. Nos. 3,002,259 and 3,169,301; the Adams et al U.S. Pat. No. 3,142,890 and the Moore U.S. Pat. No. 3,395,449.

As is well understood by those skilled in the art, where heavy gauge wire must be used for the armature winding it is better to connect the lead wires with their respective commutator bars by inserting or wedging them into slots cut into the bars, than to wrap them around tangs or hooks that project from the bars. This follows from the fact that heavy gauge wire is not easily looped about a tang or hook without bending or objectionably misshaping the hook.

Armature winding machines that are equipped to effect attachment of the coil leads to their respective commutator bars or segments by inserting the leads into slots cut into the bars, conventionally have lead inserting mechanism or tooling which includes a blade-like member mounted for reciprocation radially of the axis of an armature core assembly in position in the machine, and so located as to enter a commutator bar slot brought into lead receiving position. In that position, the slot in the commutator bar and the wire inserting blade or its equivalent, should be accurately aligned radially of the axis of the commutator, for otherwise the wire inserting blade may strike one side or the other of the slot and damage the commutator or the wire inserting tooling or both. In any event, unless the wire inserting blade properly enters the slot in the commutator bar, a satisfactory connection is not made between the wire lead and the bar. No winding machine heretofore known has been able to reliably establish and maintain such alignment.

As will be readily apparent, for the commutator bar slots and the wire inserting tooling to be brought into cooperative relationship, relative rotation between them about the axis of the commutator is necessary; and if accuracy of alignment is to be achieved, the angle through which that relative rotation takes place must be precisely controlled.

While the needed precision in the mechanism by which the required relative rotation is effected is not impossible of attainment, its assurance is difficult. And, even if that mechanism possesses the required precision, there is no assurance that in use of the machine the sought-after alignment accuracy will always be had.

Armature commutators consist of metal bars — usually copper — embedded in an annulus of insulating material; and while the bars should be uniformly spaced around the annulus, that optimum condition cannot be guaranteed in production. Moreover, the cutting of the lead-receiving slots into the commutator bars introduces possibilities of irregularity in spacing.

As a consequence of these unpredictable variations in the spacing of the commutator bar slots, the maintenance of absolute alignment between the wire inserting tooling and each commutator bar slot as it is presented thereto, has not heretofore been reliably attained.

To achieve that reliability is the primary objective of this invention. It does so by proceeding upon a recognition of the inevitable possibility of misalignment between the lead inserting tooling and the commutator bar slots presented thereto and the acceptance of that situation; but overcomes the problem by sensing or finding the misalignment and then effecting corrective relative rotation between the wire inserting tooling and the commutator as required to achieve absolute alignment.

The purpose and object of this invention, stated more completely, is thus to provide an armature winding machine with facility to recognize misalignment between the wire inserting tooling and an armature bar slot in position to receive a wire lead, and — in response to such recognition — produce a signal which, through the functioning of instrumentalities responsive to the signal, effects operation of drive means by which the relative rotation between the wire inserting tooling and the commutator needed to establish absolute alignment, is accomplished.

Although this broad objective is attainable by different means, in the embodiment of the invention disclosed herein, it is accomplished through the use of optical sensing means, arranged to "see" misalignment between the wire inserting tooling and an armature bar slot in position to have a lead tucked into it, and to produce a signal indicative of the misalignment and the magnitude thereof which signal, in turn, controls a reversible drive motor by which such relative rotation between the commutator and the wire inserting tooling is effected, as required to bring about the desired alignment.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 12:
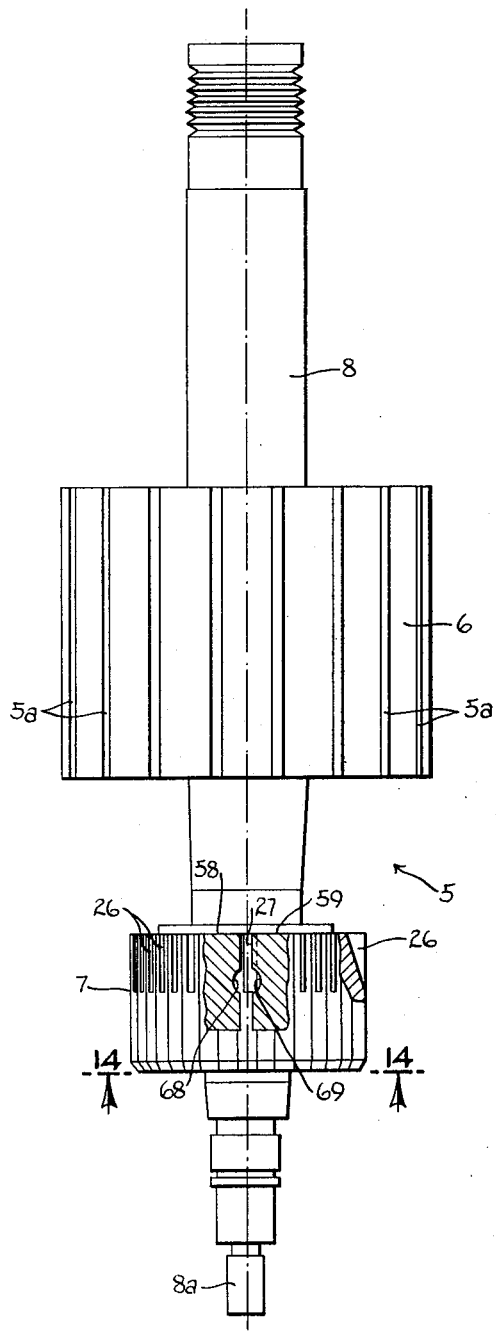
FIG. 12 is a plan view of an armature core assembly with part of its commutator broken away and in section and with part of the wire guiding means of the lead attaching instrumentalities in position above the commutator.
Figure 14:
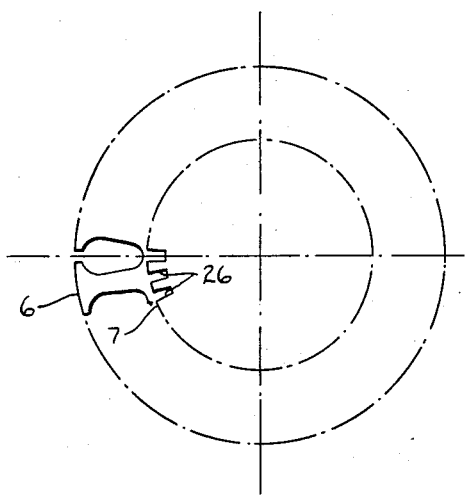
Figure 16:
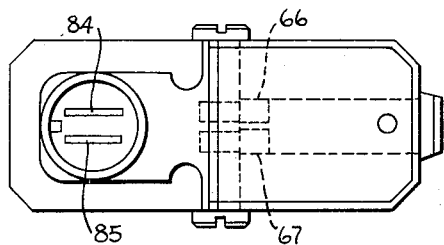
Figure 15:
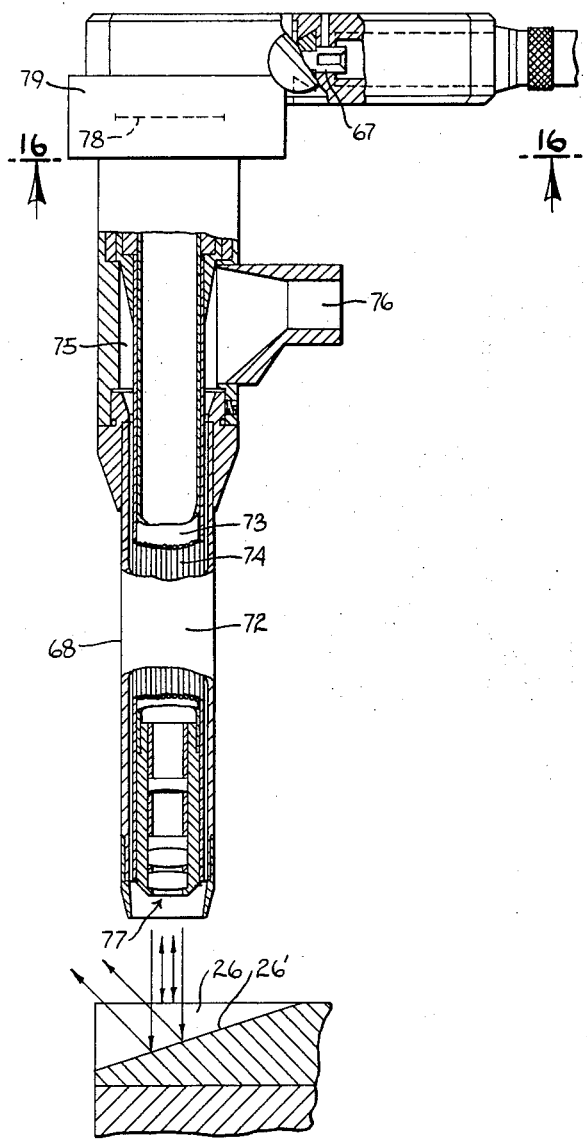
Figure 19:
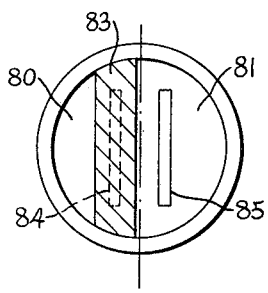
Figure 20:
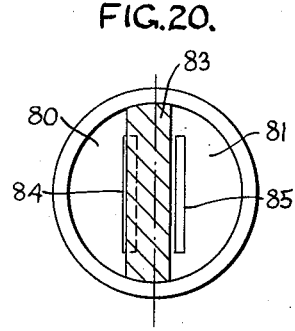
Figure 21:
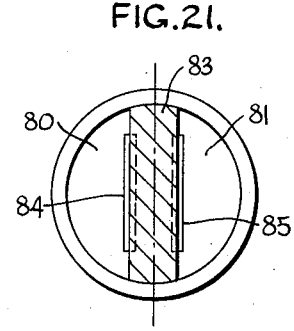
Figure 17:
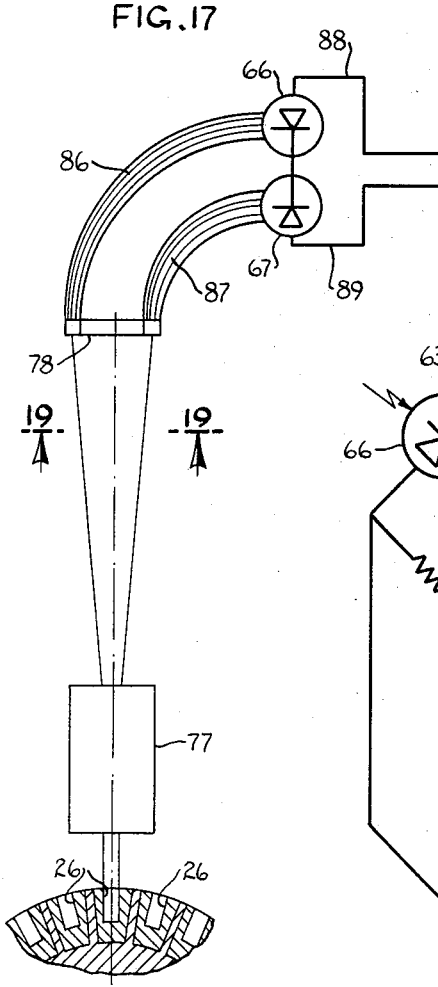
Figure 18:
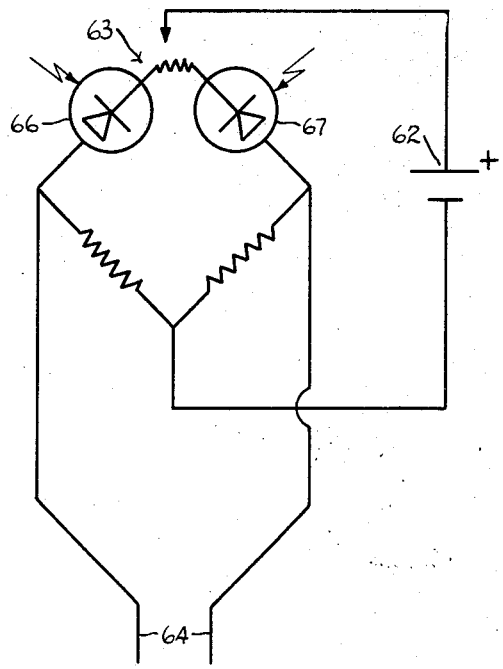

FIG. 14 diagrammatically illustrates the relationship between the slotted core and the commutator bar slots of an armature core assembly, said view being taken on the plane of the line 14—14 in FIG. 12;

FIG. 15 is a side view with parts broken away and in section, of one of the optical sensing devices, in position to look at the slotted cylindrical surface of an adjacent commutator bar;

FIG. 16 is a sectional view through FIG. 15 on the plane of the line 16—16;

FIG. 17 diagrammatically illustrates the manner in which the optical sensing means functions to produce a signal indicative of misalignment between the lead inserting instrumentalities and the armature bar in position to receive a lead;

FIG. 18 diagrammatically illustrates one way of utilizing the sensor-produced signal to control a drive motor by which corrective relative rotation is effected between the lead inserting instrumentalities and the commutator; and FIGS. 19, 20 and 21 depict the image seen by the optical sensor during misalignment and alignment, said view being taken on the plane of the line 19—19 in FIG. 15.

Figure 1:
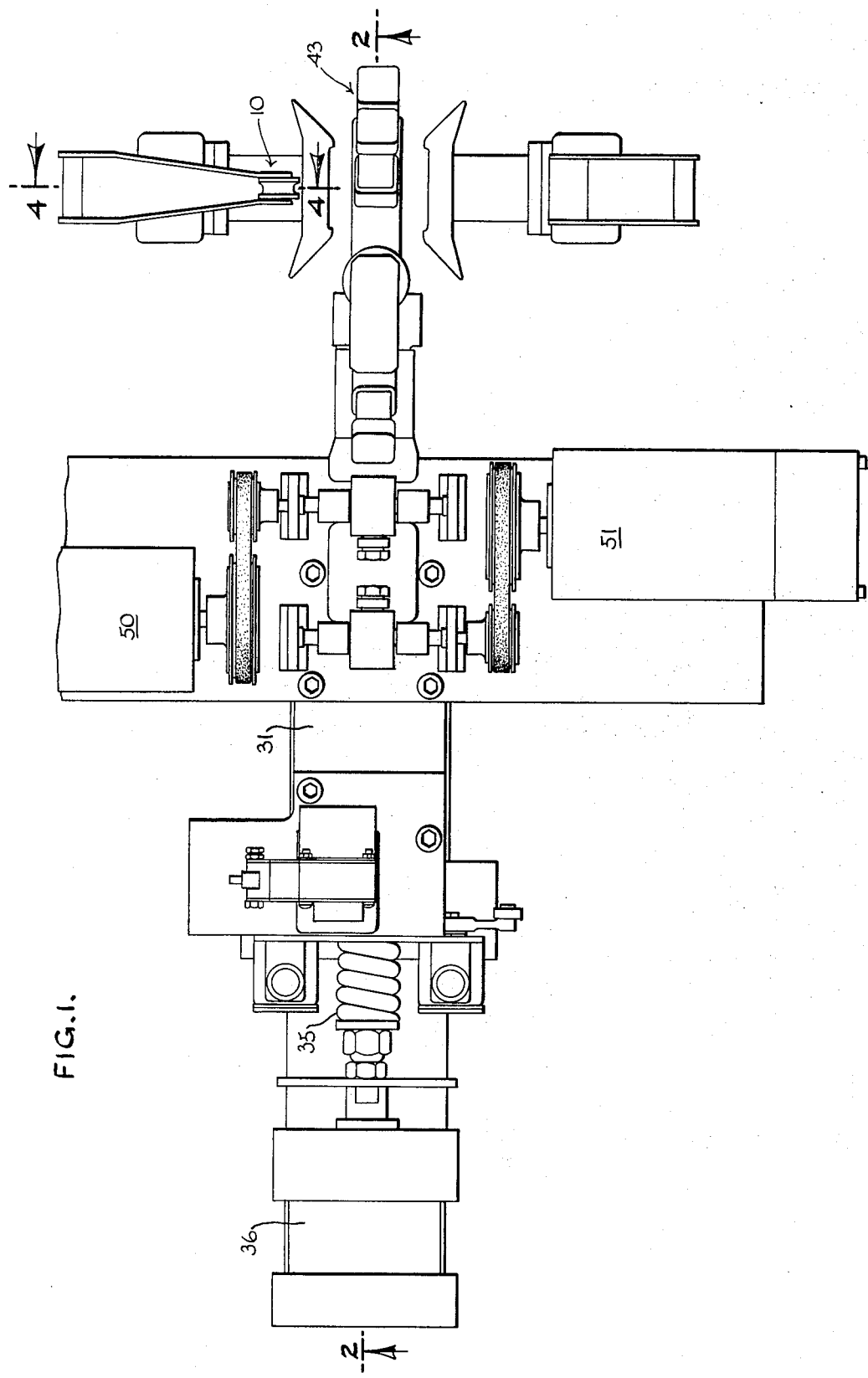
FIG. 1 is a top plan view of that portion of an armature winding machine with which the improved lead attaching instrumentalities of this invention are operatively associated.
Figure 2:
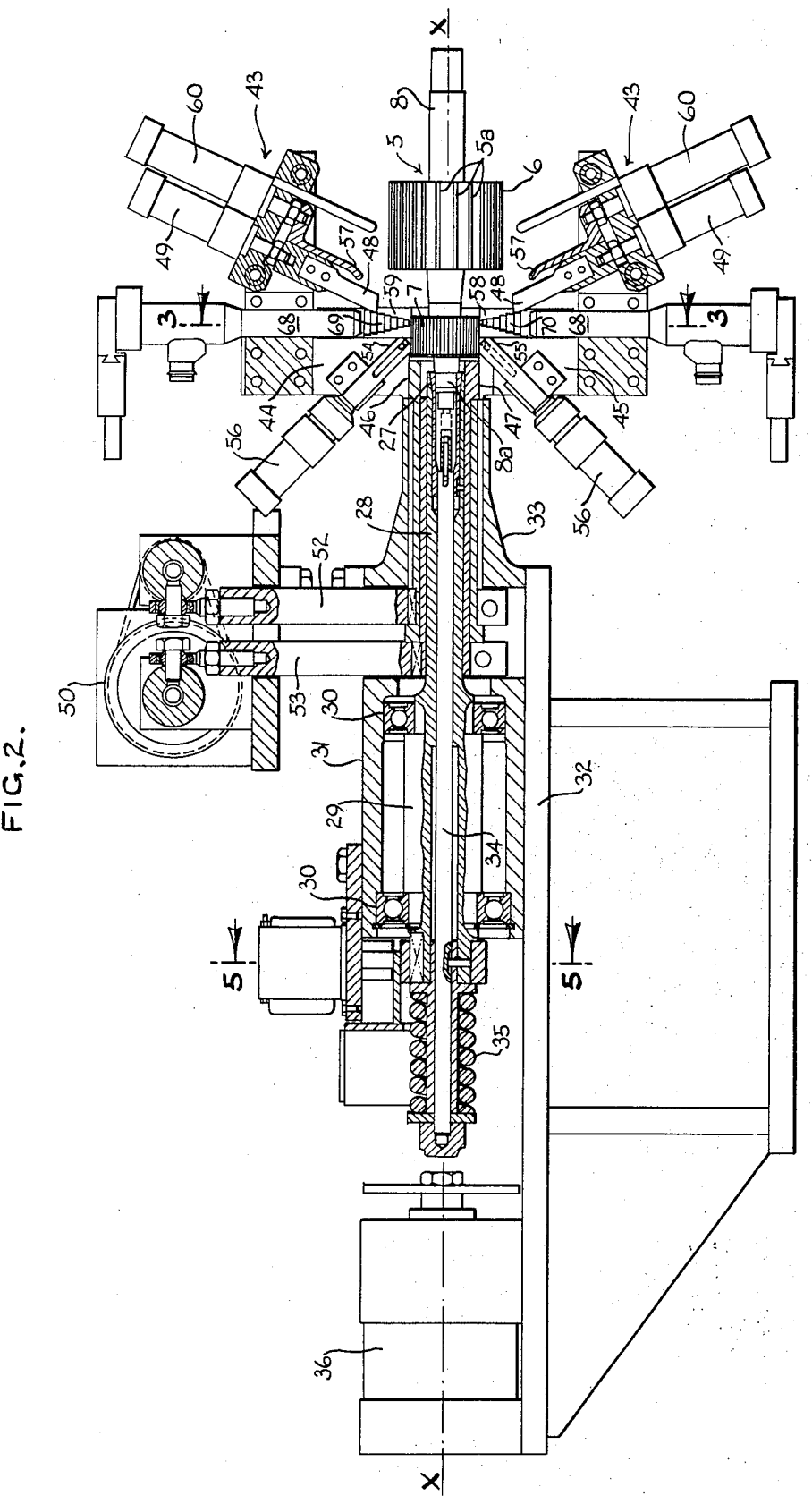
FIG. 2 is a longitudinal sectional view through FIG. 1 on the plane of the line 2—2.

Referring to the accompanying drawings in which like numerals indicate like parts throughout the several views, the numeral 5 designates generally an armature core assembly (FIGS. 2, 9, 11 and 12) of the type wound by the winding machine of this invention. As best seen in FIGS. 2 and 12, the armature core assembly comprises a slotted core 6 and a commutator 7 fixed on a common shaft 8. The core is customarily laminated, although this feature is not illustrated in the drawings, and its slots into which the coils are wound are designated by the numeral 5a.

When in position to be wound, the core of the armature core assembly is embraced by a pair of shrouds 9 (FIG. 3) having concave faces 9b which, in the operative positions of the shrouds, embrace the core and cover all but the two pairs of its angularly spaced slots into which coils of wire are to be wound by the conventional rotating flyers 10.

Figure 3:
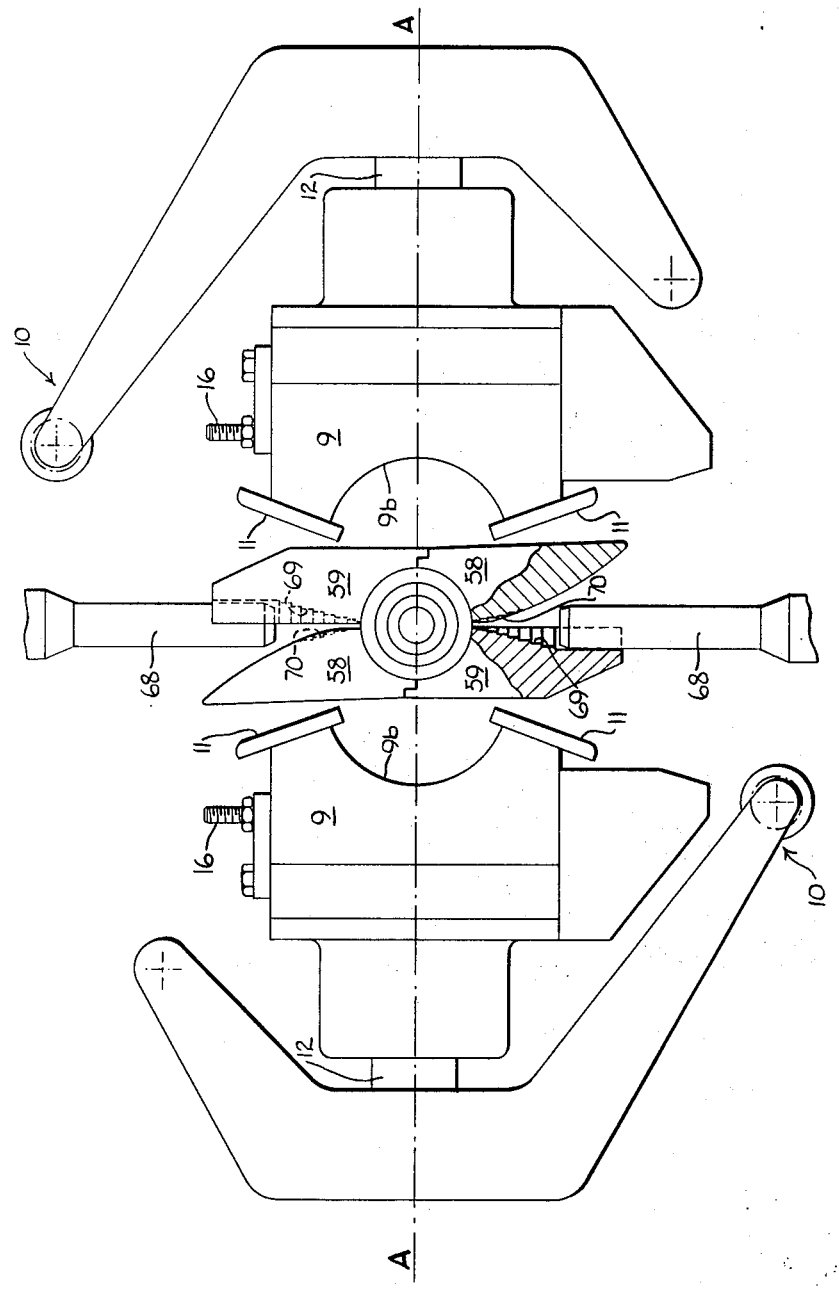
FIG. 3 is a cross sectional view through FIG. 2 on the plane of the line 3—3.

As is customary, the flyers 10 are mounted for rotation about a common axis, designated A—A in FIG. 3, which axis intersects that of the armature core assembly in position to have wire wound simultaneously into the two uncovered pairs of the core slots 5a, the wire being drawn from a source thereof and guided by wings 11 into the core slots.

The shrouds 9 and the flyers are mounted by conventional structure, not illustrated, for movement toward and from one another, to enable insertion and removal of armature core assemblies. As is customary, the flyers 10 rotate on hollow shafts 12 that project from the shrouds, and one of the shrouds has mechanism mounted therein for indexing the armature core assembly about its axis, to successively bring different pairs of core slots 5a into coil receiving position.

Figure 4:
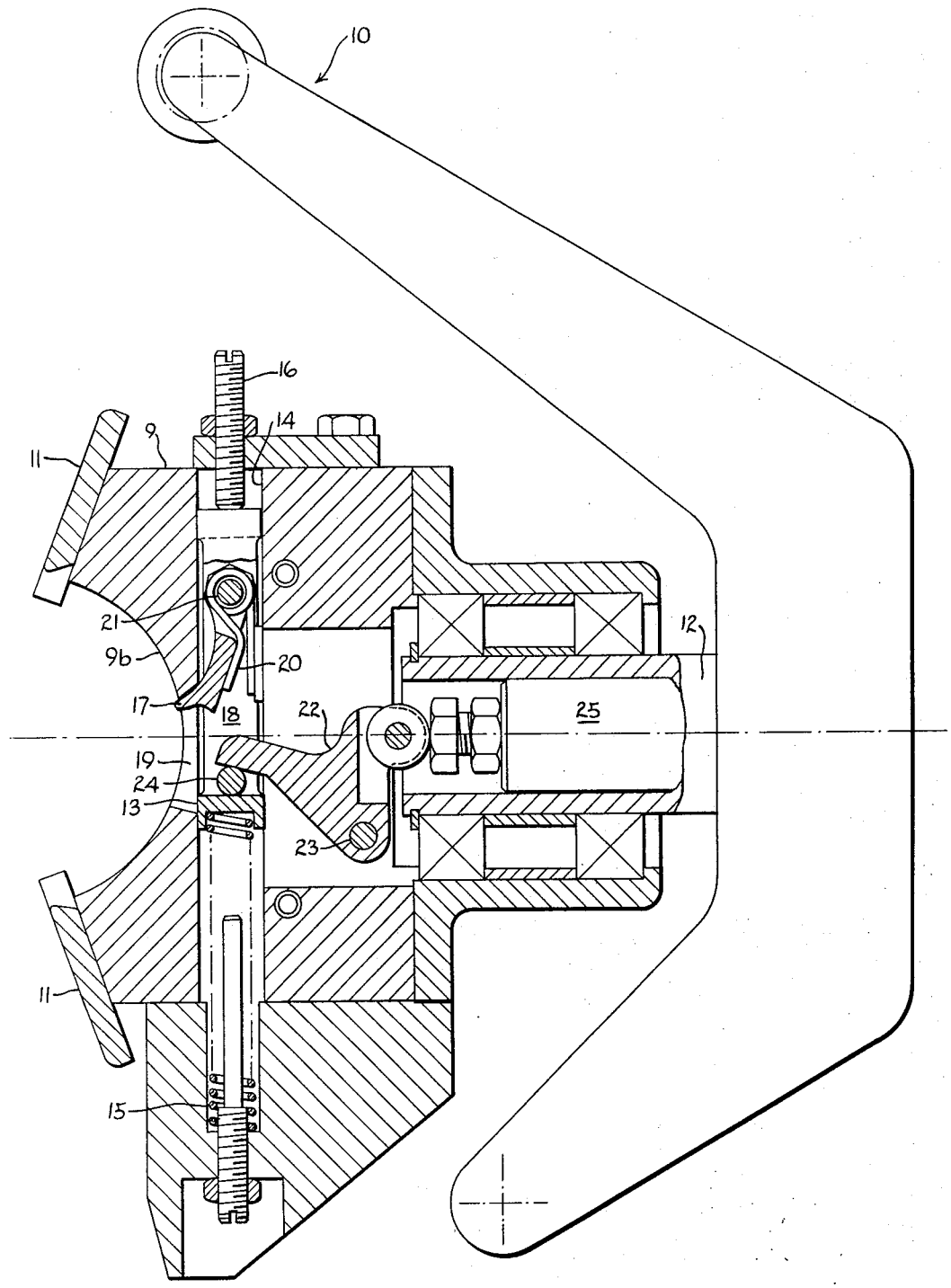
FIG. 4 is a cross sectional view through FIG. 1 on the plane of the line 4—4 but at an enlarged scale.

The mechanism for indexing the armature core assembly is illustrated in FIG. 4 and comprises a bar-like carrier 13 slidably mounted in a bore 14 and is yieldingly urged by a spring 15 to a position defined by an adjustable stop screw 16. In the position defined by the stop screw 16, the tip of a pawl 17 which is pivotally mounted in a slot 18 in the carrier, projects through an opening 19 in the concave wall of the shroud, being yieldingly biased to that position by a torsion spring 20 encircling the pivot 21 that connects the pawl with the carrier. A bell crank lever 22, pivoted as at 23 to the shroud 9, has one leg thereof projecting into the slot in the carrier 13 to bear against a pin 24 fixed in the carrier and slide the carrier downward with reference to FIG. 4, upon operation of a hydraulic cylinder 25, or other suitable actuator. Such downward motion of the carrier causes the pawl to rotate the armature core.

Thus, by controlling and timing the operation of the actuator 25, an armature core assembly embraced by the two shrouds will be properly indexed at the conclusion of each winding operation.

Figure 10:
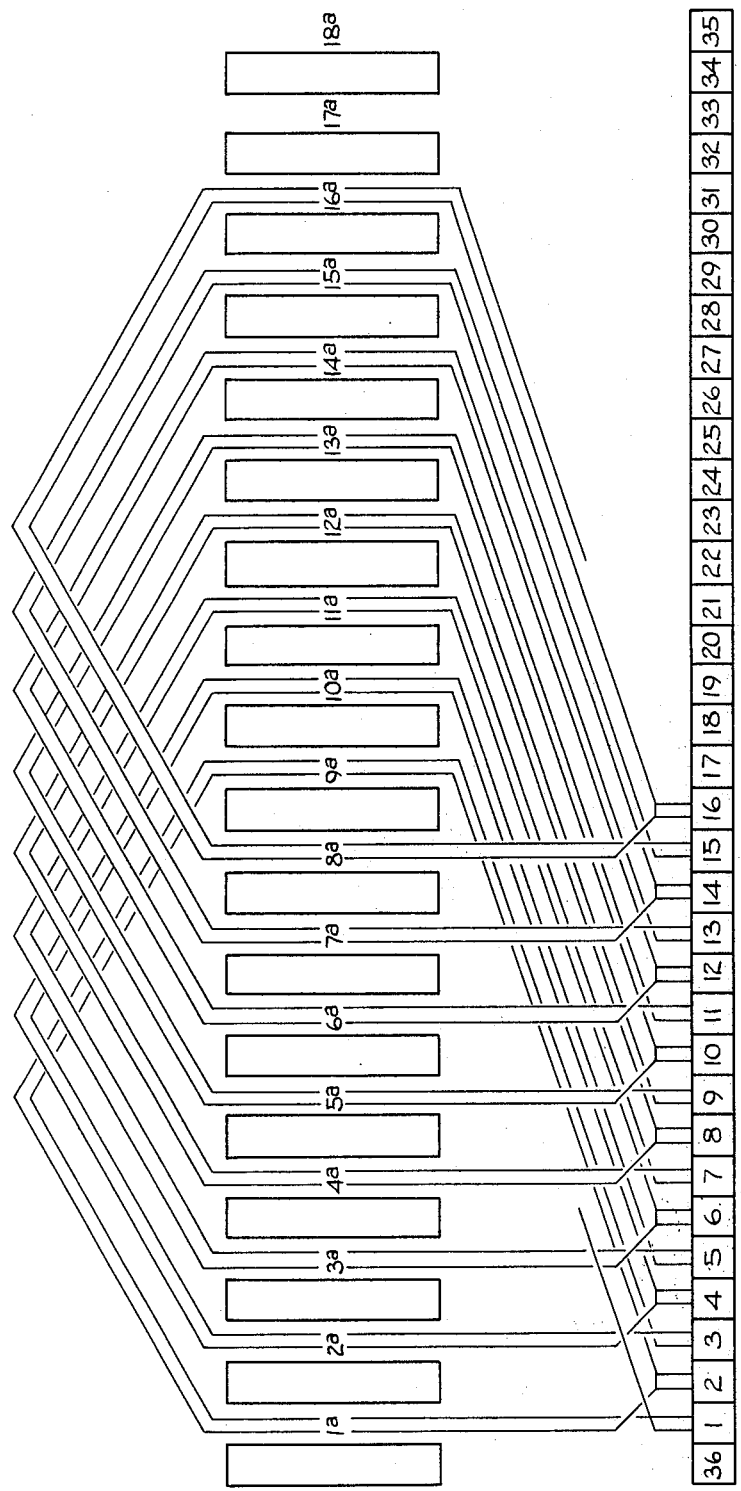
FIG. 10 is a winding diagram typical of the armature winding done with the machine of this invention.
Figure 11:
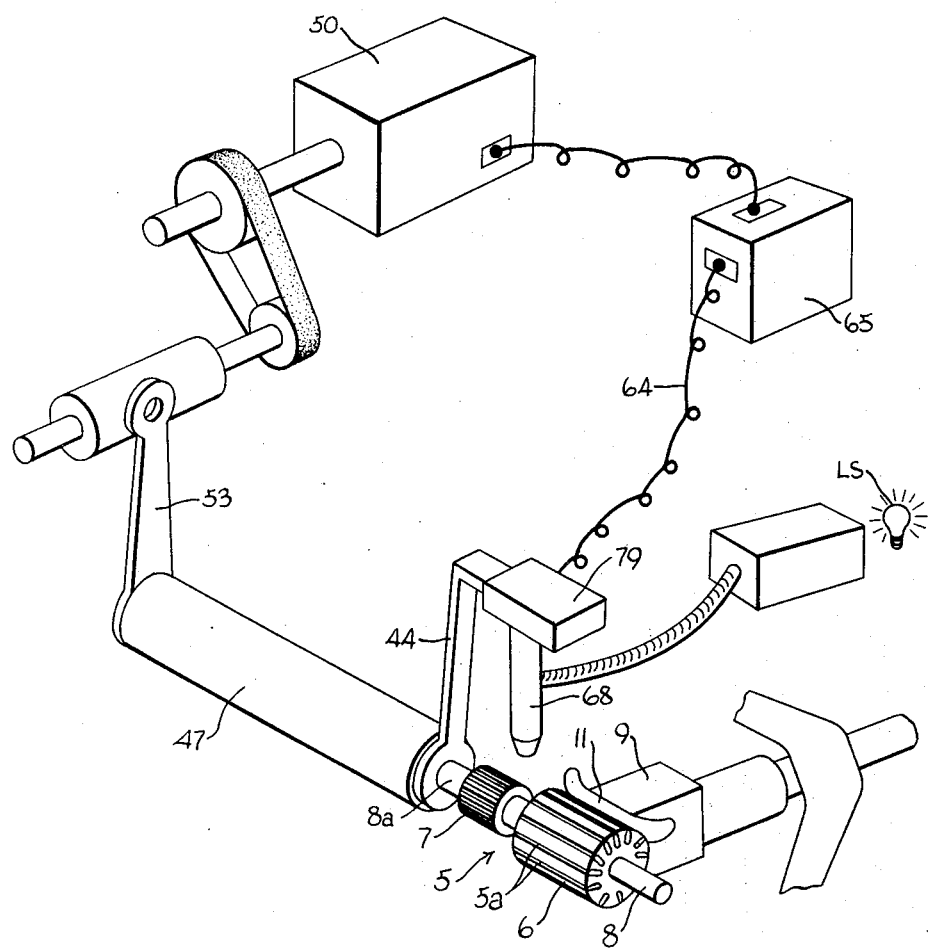
FIG. 11 is a perspective view diagrammatically illustrating the way in which the optical sensing means "discovers" misalignment and the drive instrumentalities governed by signals produced by the sensing means correct the misalignment.

Between successive coil winding operations, the ends of the just-wound coils and of the next-to-be-wound coils, are connected to selected commutator bars, the selection being in accordance with a predetermined winding pattern, which may be like that diagrammatically illustrated in FIG. 10. In the pattern there shown, the turns of the winding that are laid into the slots 1a and 9a have their ends connected to the commutator bars 1 and 2, and 2 and 3; and with each successive index of the armature core, the coils are wound into the next adjacent paired slots and have their beginning and ending leads connected with the next adjacent commutator bars, as can be readily determined from FIG. 10. It should be understood, though, that the present invention is not confined to implementation of any particular winding pattern.

Since in the winding pattern of FIG. 10, the commutator bars to which the ending leads of the successive coils are connected are substantially angularly displaced from the core slots from which those leads emerge, it is evident that the armature core assembly must be rotated at the conclusion of each winding operation, to bring the proper commutator bar into position to have the ending leads attached thereto.

Each commutator bar will have two leads connected to it, the connection — in accordance with this invention — being made by inserting or driving the leads into slots 26 that are cut into the ends of the commutator bars adjacent to the core.

The rotation of the armature core assembly required to bring the selected commutator bars into lead-receiving position, is not performed by the indexing pawl 17 but by a collet 27 mounted in one end portion of a tubular projection 28 that extends from a hollow spindle 29 journaled by means of bearings 30 in a housing 31. The housing 31 is suitably mounted on a frame 32 to which is also secured a hollow cylindrical sleeve 33.

The collet 27 is adapted to grip the end portion 8a of the shaft 8 of an armature core assembly in winding receiving position, and since the collet turns with the hollow spindle 29, rotation imparted to the latter will rotate the armature core assembly gripped by the collet. It is to be understood that, when such rotation is imparted to the armature core assembly, the shrouds 9 will be separated sufficiently to accommodate the same.

The axis about which the hollow spindle 29 and the collet turn is indentified as x—x in FIG. 2, this therefore also being the axis of an armature core assembly in winding receiving position.

Since the collet is conventional, it has not been illustrated in detail, it being sufficient to note that — through a rod 34 which extends axially from the collet the force of a compression spring 35 is imparted to the collet to cause it to grip the shaft of an armature core assembly. When the armature shaft is to be released from the grip of the collet, a hydraulic cylinder 36 projects its plunger against the rod 34 to force the same to the right in FIG. 2, against the force of the spring 35.

Figure 5:
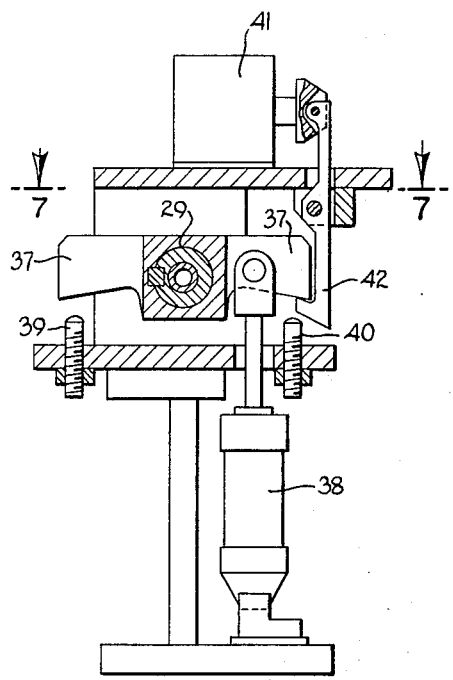
FIG. 5 is a detail sectional view through FIG. 2 on the plane of the line 5—5 and illustrating the structure by which the armature core assembly is rotated to bring the selected commutator bars opposite the lead attaching instrumentalities or tooling.
Figure 6:
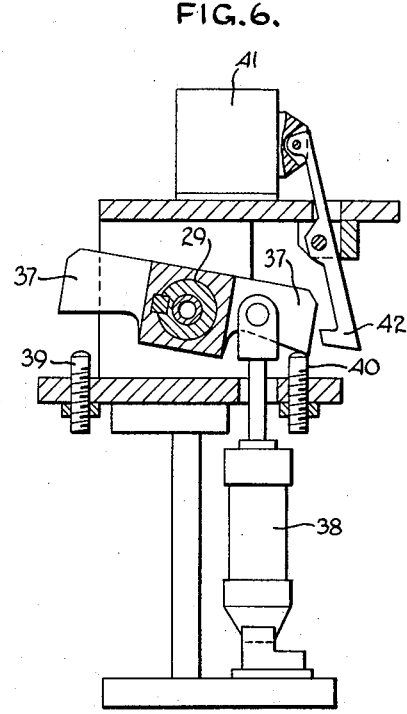
FIG. 6 is a sectional view similar to FIG. 5 but with the elements of the structure shown therein, in another position.
Figure 7:
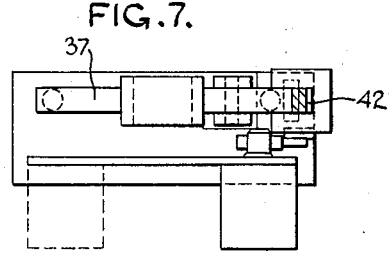
FIG. 7 is a detail sectional view through FIG. 5 on the plane of the line 7—7.
Figure 8:
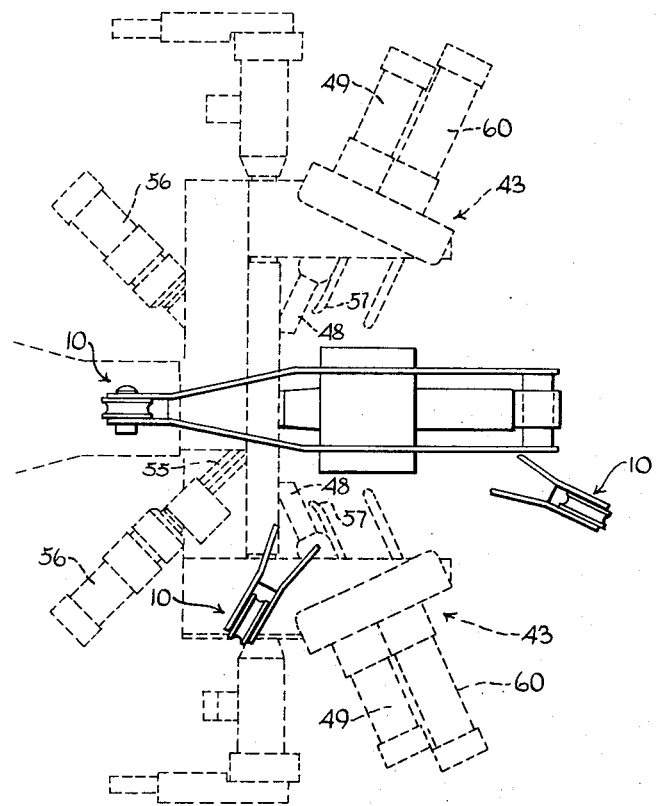
FIG. 8 is a more or less diagrammatic view illustrating the lead inserting tooling in dotted lines and showing one of the flyers of the winding machine in several locations along the orbit thereof.

Rotation is imparted to the hollow spindle 29, and hence to the collet, by mechanism illustrated in FIGS. 5, 6 and 7. As there shown, a pair of arms 37 is secured to the hollow spindle 29 to project to opposite sides thereof. One of these arms has an actuator 38 connected with it to rock the arms and thereby rotate the spindle 29 about the axis X—X through an angle determined by the adjustment of stops 39 and 40 in positions to have the ends of the arms collide therewith.

The actuator 38 by which the aforesaid rotation is imparted to the hollow spindle 29 is preferably a hydraulic cylinder, the operation of which is suitably timed to coordinate with the functioning of the cylinder 36 and an electromagnet 41 by which a latch 42 is actuated, to disengage the same from the adjacent arm 37 and permit the arms to be rocked through an angle determined by the setting of the stop 40.

During the increment of rotation imparted to the hollow spindle 29 by the rocking of the arms in the direction towards collision with the stop 40, the collet 27 has the shaft of the armature assembly in its grasp, but during retrograde rotation of the hollow spindle resulting from the arms being rocked in the opposite direction, the grip of the collet on the armature shaft is released — such successive gripping and release being achieved by properly timed actuation of the hydraulic cylinder 36.

This conjoint functioning of the actuator 38, the cylinder 36 and the electromagnet 41 takes place between winding operations and is repeated as often as necessary to bring the selected commutator bars opposite the lead inserting instrumentalities or mechanisms of the machine, it being understood that there are two wire lead inserting instrumentalities — one for each flyer — and both generally designated by the numeral 43.

The two lead-inserting instrumentalities or mechanisms, which are identical except for their placement on the machine, are roughly diametrically opposite with respect to the axis X—X, one above and the other below said axis. They are mounted in these locations by brackets 44 and 45 that respectively project upwardly and downwardly from coaxial telescoped tubes 46 and 47, the outer tube 46 which carries the bracket 44 and hence the upper lead inserting mechanism, being journalled in the tubular housing 33 and the inner tube 47 being journalled in the outer tube. Both tubes thus are rotatable about the axis X—X and, by such rotation, can change and adjust the angular position of the arms 44 and 45 and the wire inserting instrumentalities mounted thereon.

The wire inserting mechanisms 43 have wire-tucking blades 48 that are reciprocably mounted for endwise movement in a plane accurately radial to the axis X—X and along paths which should lead the outer ends of the blades into the slots 26 in the commutator bars in lead receiving positions; such endwise movement being imparted to the blades by fluid pressure motors 49. Accurate alignment of the paths of the lead tucking blades with the armature bar slots is the objective of this invention.

Since the stepwise rotation imparted to the hollow spindle 29 brings the selected commutator bars into positions opposite the wire inserting instrumentalities, only a relatively small degree of rotation of the tubes 46 and 47 is necessary to effect accurate alignment of the blades 48 of the wire inserting instrumentalities with the lead receiving slots in the selected commutator bars. That small, though very important rotary motion is produced by drive motors 50 and 51, drivingly connected, respectively, with the tubes 46 and 47.

Figure 9:
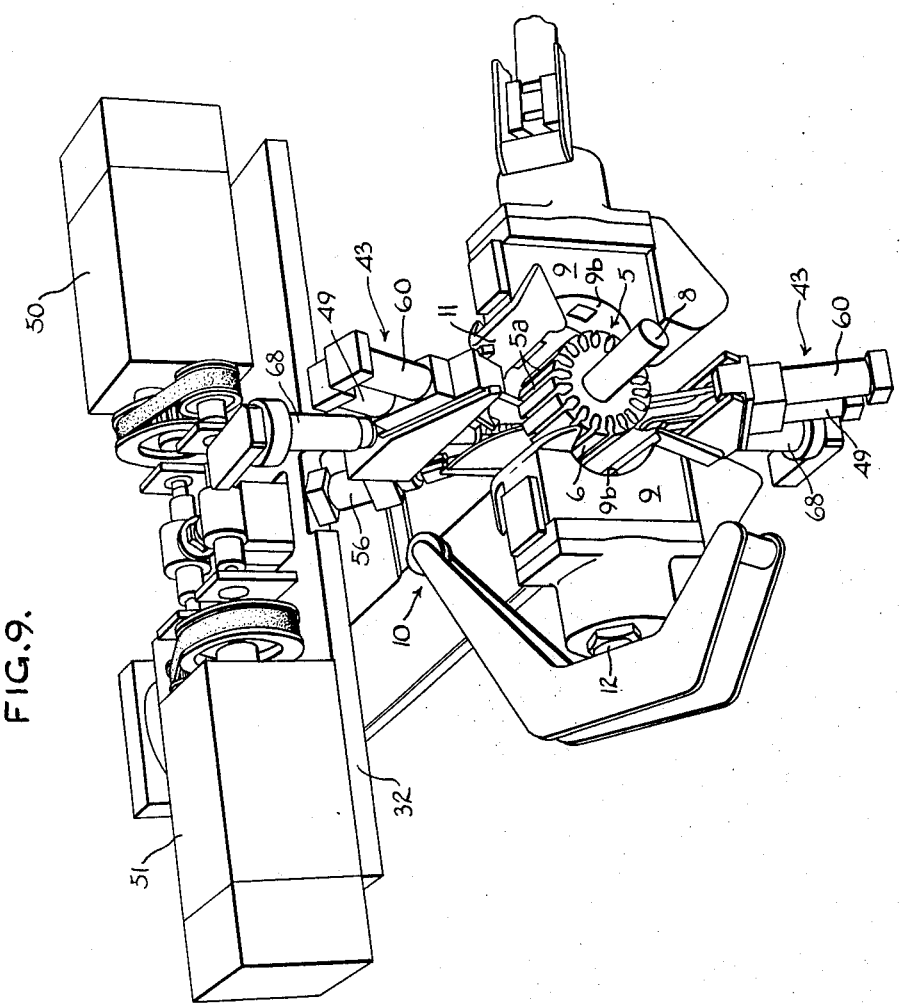
FIG. 9 is a perspective view of the mechanism by which the invention achieves its purpose in the present embodiment thereof.

As shown in FIGS. 2 and 9, the drive motors 50 and 51, which are of the stepping variety and hence capable of very small increments of rotation, are mounted on the frame 32. Their output shafts are drivingly connected, through "back-lash free" motion transmitting means, with arms 52 and 53 that extend radially from and are fixed to tubes 46 and 47, respectively, so that even the slightest rotation of the motors produces some angular adjustment of the brackets 44 and 45 and the lead inserting instrumentalities mounted thereon.

The lead inserting instrumentalities, in addition to their blades and drive motors, include lead holding devices 54 and 55 by which the leads coming from the just-wound coils and going to the start of the next coils to be wound, are held preparatory to being inserted or tucked into their respective commutator bar slots by the blades 48.

The lead holding or gripping devices are of conventional construction and are actuated in proper timed relationship to the other elements of the machine by properly controlled actuators 56.

The same mounting structure on which the blades 48 are mounted, also mounts lead depressing fingers 57 by which the leads going to and coming from the lead holding devices 54 – 55 are moved radially towards the cylindrical surface of the commutator and the portions of these leads that span the distance between the armature core and the commutator are pushed down toward and directly adjacent to the armature shaft. This too is conventional.

As indicated hereinbefore the essence of this invention is in its provision for assuring accurate alignment of each wire-tucking blade 48 with the commutator bar slot 26 into which it is about to insert a lead. To that end each bracket 44 – 45 has a pair of guide shoes 58 – 59 mounted thereon, the opposing inner surfaces of which converge towards the axis x—x to define between them a narrow slot slightly wider than the diameter of the wire wound onto the armature core. The inner surface of the shoes 58 is convexly curved while that of the shoes 59 is flat, as best seen in FIG. 3.

Although the pairs of guide shoes mounted on the brackets 44-45 are generally opposite one another, they are movable relative to and independently of one another about the axis X—X along with the brackets in consequence of the rotary adjustment of the tubes 46-47. Hence, by slightly rotating these tubes in the proper direction the narrow slots to which the converging inner surfaces of the guide shoes lead can be brought into precise registry with the commutator bar slots in position to receiving coil leads.

Not only do the converging inner surfaces of the guide shoes 58-59 guide the wire leads to the mouths of the commutator bar slots, they also guide the projection of wire-tucking blades radially towards the commutator to assure that they will move smoothly and accurately into the commutator slots 26 as they stuff leads into them.

Two wire leads, one above the other, can be simultaneously guided to the mouth of a commutator slot by the guide shoes and simultaneously wedged into the slot by the wire-tucking blade. Placement of the leads in such superimposed relation results from coaction between the flyers 10 and the lead holding or gripping devices 54-55. By this coaction the leads coming from the just-wound coils are held or gripped at a point contiguous to the periphery of the commutator and adjacent to the side of the pair of guide shoes that is remote from the armature core, while the flyer carries the wire back between the guide shoes towards the core to form the beginning of the next-to-be-wound coil. Since this placement of the lead wires by the coaction of the flyers and the wire holding or gripping means forms no part of this invention, the details thereof have not been illustrated, the only important thing about these parts being that they coact to place both the ending and the beginning coil leads, one above the other into the guideway defined by the guide shoes.

When the ending and beginning coil leads have been thus placed between the guide shoes, the lead depressing-forming fingers 57 are projected towards the armature axis by air cylinders 60 to push the wires going to and coming from the wire holding and gripping means down into the throat of the guideway defined by the guide shoes. As already noted this action of the fingers 57 also causes the lead wires to hug the armature shaft between the commutator and the core.

With the lead wires thus positioned, the wire tucking blades 48 tuck the wires into the slots 26. As is conventional the act of tucking or stuffing the wires into the commutator slots, strips the insulation from the portion of the wires pushed into the slots and establishes a good electrical as well as mechanical connection between the wires and the commutator bars. These connections are further perfected by a soldering operation or its equivalent after the wound armature is removed from the machine.

After the wires have been thus attached to the commutator bars, the looped portions thereof which result from their being engaged about a hook that forms part of the wire holding and gripping means, are cut off in any suitable way flush with the periphery of the commutator.

As noted hereinbefore, accurate alignment between the wire inserting instrumentalities, especially the wire-tucking blades 48 thereof, and the commutator bar slots requires relative rotation therebetween, and in the disclosed embodiment of the invention this relative rotation is produced by causing the stepping motors 50-51 to run in one way or the other to impart such corrective rotation to the tubes 46-47 as needed to bring the wire inserting instrumentalities which are carried by the tubes by virtue of their being fixed to the brackets 44-45, into exact alignment with the commutator slots into which lead wires are to be inserted.

Power is independently supplied to each motor 50-51 from a source 62 (FIG. 18) under control of a Wheatstone bridge 63 or its equivalent, the output leads 64 of which are electrically connected with the motors through suitable amplifying means 65. The control elements of each bridge are a pair of photoelectric transducers 66 – 67 that respond differentially to imbalance in the magnitude or amount of light impinging the same, and in accordance with the present invention, this in turn depends upon the angular relationship between the guideway defined by the guide shoes 58 – 59 and the commutator slot to which it leads.

To accomplish that objective an optical probe 68 is mounted in each guideway defined in a pair of guide shoes, to scan or view the commutator bar in position to have leads attached thereto as best seen in FIG. 3. By its securement to the respective bracket 44 – 45 the probe is held with its axis exactly radial to the axis of the commutator. The probe constitutes a part of a sensing instrumentality that produces a signal which is indicative of the exact location of the mouth of the slot in the commutator bar with respect to the lead inserting or attaching instrumentalities. As will be later described, that signal activates the drive means by which misalignment between the lead inserting or attaching instrumentality and the slot is corrected.

Figure 13:
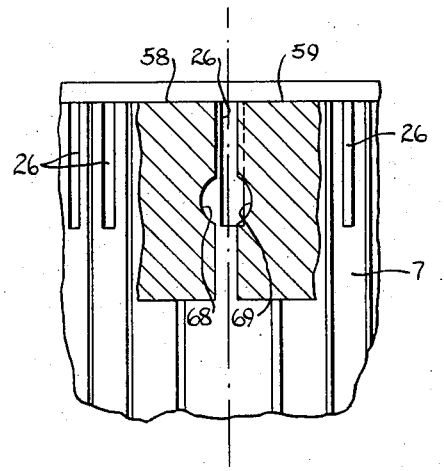
FIG. 13 is an enlarged detail view of part of the structure shown in FIG. 12.

To accommodate the probe the guide shoe 59 which has a flat inner face, is provided with a semi-cylindrical socket 69 having a progressively stepped smaller radius. The innermost portion of the convexly curved inner surface of the guide shoe 58 also has a semi-cylindrical socket 70 with a progressively stepped smaller radius. Together the innermost portions of the semi-cylindrical sockets 69 and 70 define a round port which straddles or is bisected by the mediam plane of the guideway defined by the guide shoes and which plane is accurately radial to the axis X—X (FIGS. 12, 13). Since the axis of the probe 68 is at all times radial to the axis X—X, it coincides with the median plane of the guideway.

To avoid reflections from the semi-cylindrical surfaces of the sockets 69-70 that might impair the performance of the probe, these surfaces are suitably blackened or otherwise rendered non-reflective.

Each probe, as best seen in FIGS. 15 through 21, comprises an outer tubular shell 72 coaxially encircling an inner tubular shell 73 with an annular space therebetween. In this annular space there are many longitudinally extending light conveying fiber-glass fibers 74, all parallel to the axis of the probe. The outer end portion of this annular "bundle" of fiber-glass fibers extends into a chamber 75 in the outer end of the probe (FIG. 15) that communicates with the annular space between the coaxial tubular shells 72 and 73 and has a laterally disposed light entry port 76 opening to it. Hence, light from a suitable source LS (FIG. 11) that enters the chamber 75 through the port 76 brightly illuminates the outer end portions of fiber-glass fibers which convey that light to the mouth of the probe from which it is projected onto the cylindrical surface of the commutator bar being scanned by the probe. The light striking the surface of the commutator bar at opposite sides of the slot 26 therein is reflected as two parallel beams back into the mouth of the probe and more particularly into the inner tubular shell 73, but since the bottom 26' of each commutator bar slot 26 is not parallel to the commutator axis, but inclined thereto as shown in FIG. 15, the light reflected from it does not enter the probe.

An optical system designated generally by the numeral 77 inside the inner tubular shell 73 of the probe utilizes the two parallel beams of reflected light to form an image of the commutator bar on a reading plane 78 provided by a suitable flat member mounted in a housing 79 at the outer end of the probe. Since none of the light reflected by the bottom of the slot 26 enters the optical system in the probe, the light that does impinge upon the reading plane forms two illuminated areas 80 and 81 at opposite sides of a dark area 83 the width of which corresponds to that of the slot 26 in the commutator bar being scanned.

On the reading plane are two parallel rectangular light sensitive bands 84 and 85 symmetrically disposed with respect to the axis of the probe. The inner edges of these two bands are spaced apart somewhat less than the width of the dark area 83. Since the axis of the probe is accurately radial to the axis of the commutator, any deviation from correct alignment between the commutator bar slot 26, of which the dark area 83 is an image, and the probe axis results in one or the other of the two light sensitive bands 84 – 85 being blocked off, either completely or partially, by the dark image 83 of the slot, as shown in FIGS. 19 and 20. Under that condition the light energy available at the two light sensitive bands 84 – 85 is unequal; but when the slot 26 in the commutator bar is accurately centered with respect to the axis of the probe, symmetry exists in the disposition of the bands on the reading plane and the light energy available at the two outer bands 84 – 85 is identical.

The light energy from the two bands 84 – 85 is conducted to the light sensitive transducers 66 – 67 by two "bundles" of light transmitting fiber-glass fibers 86 – 87.

It is the differential relationship between the light energy available at the outer bands 84 – 85 which produces the signal that controls the operation of the motors 50 – 51, and hence the corrective adjustment of the lead attaching instrumentalities. As shown in FIG. 17, those "bundles" have their receiving ends shaped into rectangles of a size substantially equivalent to that of the light sensitive bands 84 – 85 and have their delivery ends arranged to form a round mass to more effectively project the light energy they transmit onto the photosensitive transducers.

The transducers 66 – 67 are physically located in the housing 79, and are electrically connected into the Wheatstone bridge 63 by conductors 88 – 89.

Unless both light sensitive bands 84 – 85 receive the same amount of the light reflected from the commutator bar surface being scanned by the probe, which condition exists only when the axis of the probe is accurately centered with respect to the width of the slot 26 so that the dark area 83 on the reading plane is symmetrically disposed with respect to the bands 84 – 85 as shown in FIG. 21, the outputs of the photosensitive transducers will not be equal and as a result the bridge will not be in balance.

As explained hereinbefore, imbalance in the bridge results in operation of the stepping motor controlled by that bridge, to rotate the armature core assembly in the direction needed to exactly center the slot 26 into which leads are to be driven with the axis of the probe, and since the axis of the probe coincides with the median plane of the guideway formed by the guide shoes 58 – 59, when that centered condition exists the wire inserting instrumentalities and especially the wire tucking blade 48 thereof, will be properly aligned with the slot.

Although it is undoubtedly apparent from the foregoing description and the accompanying drawings, that since the winding machine disclosed herein is of the double flyer type, the lead inserting instrumentalities, the optical sensing system and the corrective drive mechanism governed thereby to rotate the lead inserting instrumentalities as required to correct any detected asymmetry between a commutator bar slot into which lead wires are to be stuffed and the stuffing tool of the lead inserting instrumentalities, are duplicated, one for each flyer. Therefore, wherever the description of these duplicated components of the machine appears in the singular, it should be understood that it applies to both. Also, since one of the lead inserting instrumentalities and its associated optical sensing systems is positioned above the axis of the armature core assembly in position in the machine and the other set thereof is below that axis, the outer end of the sensing probe of the upper set faces downward while that of the other set faces upward.

In the operation of the machine, corrective realignment between the lead inserting instrumentalities and the commutator bar slots in position to receive leads, takes place at the conclusion of the winding of each of the series of coils which collectively comprise the armature winding, but obviously any correction required after the first one may be very small since it can be expected that the spacing between commutator bar slots will be reasonably uniform. Nevertheless, by virtue of this invention exact alignment is assured for each and every lead staking operation.

The control system of the machine, which has not been illustrated or described since it forms no part of this invention, is so designed that the instant correct alignment between the lead inserting instrumentalities and the commutator bar slots is established the flyers 10 function to engage the wires coming from the just-wound coils with the holding or gripping means 54, 55, and in so doing place those stretches of the wires contiguous to the slots into which they are to be stuffed. Then with the wires gripped, the flyers bring the stretches of the wires coming from the holding or gripping means into positions directly over and in line with the already positioned stretches.

With the stage thus set, the wire depressing fingers 57 operate to bring both stretches of the wires — those going to and those coming from the wire holding or gripping means — directly adjacent to the mouths of the commutator bar slots and also deform the stretches thereof which span the distance between the commutator and the core into close juxtaposition to the armature shaft.

That done, the control system causes the lead tucking blades 48 to be projected and thereby drive the leads — one above the other — into the commutator bar slots, the blades being guided in their projection by the guide shoes 58 – 59. Because of the assurance of exact alignment between the blades 48 and the commutator slots into which the blades drive the leads, there is no danger of injury to either the sides of the commutator bar slots or the lead tucking blades as the latter enter the slots, it being understood that the thickness of the blades is no greater than the width of the slots, and in fact is somewhat less so as to prevent binding.

It should also be understood that where the terms "exact" and "exactly" are employed with respect to the alignment between the blades 48 and the commutator bar slots, they do not rule out normal tolerances.

As soon as both lead tucking blades 48 have performed their functions and have been retracted, the armature core assembly can be rotated by means of the collet 27, and during such rotation the loops of the leads which resulted from their being engaged with the hook portion of the wire holding or gripping means and which protrude above the commutator bar surfaces can be severed by a shearing action effected by confronting edges of the guide shoes and the commutator bar slots.

Those skilled in the art will appreciate that the invention can be embodied in forms other than as herein disclosed for purposes of illustration.

The invention is defined by the following claims:

I claim:

1. An armature winding machine of the type wherein coils of wire are successively wound into angularly spaced pairs of slots in the core of an armature core assembly which consists of a slotted core and a commutator having electrically spaced bars fixed on a common shaft, wherein said assembly is rotatably indexed to bring the different angularly spaced pairs of its coil receiving slots into winding receiving position, and wherein the beginning and ending leads of the successively wound coils are connected to selected ones of the commutator bars by inserting the same into slots cut into the bars, said machine being characterized by:

A. lead attaching instrumentalities comprising lead holding, lead guiding and lead inserting means by which a lead going to the start of a coil to be wound and/or a lead coming from the end of a just-wound coil is held in juxtaposition to the mouth of the commutator bar slot into which it is to be inserted, is guided to the mouth of said slot and is inserted into the slot;
   B. armature core assembly gripping means having an axis and operable to coaxially grip said assembly, said armature core assembly gripping means and said lead attaching instrumentalities being relatively rotatable about said axis to enable a selected commutator bar and the lead attaching instrumentalities to be brought into juxtaposition;
   C. instrumentalities operative to produce a control signal that is indicative of the exact location of the mouth of each commutator bar slot with respect to the lead attaching instrumentalities; and
   D. drive means controlled by said signal and operative to effect relative rotation between said armature core assembly gripping means and said lead attaching instrumentalities as required to align the mouth of the slot in the selected commutator bar exactly with the lead guiding and lead inserting parts of said lead attaching instrumentalities.

2. The armature winding machine of claim 1, further characterized by:

A. rotation imparting drive means connected with the armature core assembly gripping means for rotating the same to bring an assembly gripped thereby to a position in which the selected commutator bar is in juxtaposition to the lead attaching instrumentalities;
   B. wherein said control signal producing instrumentalities includes means for sensing misalignment between the mouth of the slot in the selected commutator bar and the lead guiding and lead inserting parts of the said lead attaching instrumentalities so that the produced signal is indicative of such misalignment and the magnitude thereof; and
   C. wherein said signal controlled drive means effects such relative rotation between the armature core assembly gripping means and the lead attaching instrumentalities as required to correct any sensed misalignment.

3. The armature winding machine of claim 2, wherein the lead guiding and lead inserting parts of said lead attaching instrumentalities have a common mounting structure which is rotatable about the axis of the armature core assembly gripping means; and said signal controlled drive means is connected with said common mounting structure.

4. The armature winding machine of claim 2, wherein said alignment sensing means is optical.

5. The armature winding machine of claim 4, wherein said optical sensing means comprises, a light source, means to direct light rays from said light source onto the cylindrical surface of the commutator bar in juxtaposition to the lead attaching instrumentalities, a pair of photoelectric transducers, means for impinging on said transducers light that is reflected from the cylindrical surfaces of the commutator bar flanking the slot therein whereby said transducers produce outputs of equal magnitude when the light reflected by one of said flanking surfaces equals that reflected by the other flanking surface, and means for translating difference in the outputs of said photoelectric transducers into said control signal.

6. The armature winding machine of claim 3, wherein said signal controlled drive means comprises a reversible motor and motion transmitting means connecting said motor with said common mounting structure.

7. The armature winding machine of claim 6, wherein said armature core assembly gripping means comprises a collet adapted to releasably grip the shaft of said assembly;

and wherein said common mounting structure for the lead guiding and lead inserting parts of the lead attaching instrumentalities has a tubular portion coaxially encircling said collet.

8. The armature winding machine of claim 1, but wherein two coils of wire are simultaneously wound onto the core of the armature core assembly, each by a flyer which draws wire from a source thereof and rotates about an axis that intersects the axis of the armature core assembly gripping means, wherein said lead attaching instrumentalities and said signal controlled drive means are duplicated, with one of each associated with each flyer, and wherein said two signal controlled drive means function independently of one another.

9. The armature winding machine of claim 2, but wherein two coils of wire are simultaneously wound onto the core of the armature core assembly, each by a flyer which draws wire from a source thereof and rotates about an axis that intersects the axis of the armature core assembly gripping means, wherein said lead attaching instrumentalities, said control signal producing means and said signal controlled drive means are duplicated, with one of each associated with each flyer, and wherein said two signal controlled drive means function independently of one another.

10. The armature winding machine of claim 3, but wherein two coils of wire are simultaneously wound onto the core of the armature core assembly, each by a flyer which draws wire from a source thereof and rotates about an axis that intersects the axis of the armature core assembly gripping means, wherein said lead attaching instrumentalities, said control signal producing means and said signal controlled drive means are duplicated, with one of each associated with each flyer, and wherein said two signal controlled drive means function independently of one another.

11. The armature winding machine of claim 10, wherein each of said two signal controlled drive means comprises a reversible motor and a motion transmitting connection between said motor and said common mounting structure.

12. The armature winding machine of claim 6, wherein said common mounting structure includes a hub portion constrained to rotate about the axis of said armature core assembly gripping means, and wherein said motion transmitting connection has a rotation imparting connection with said hub portion.

13. The armature winding machine of claim 12, but wherein two coils of wire are simultaneously wound onto the core of the armature core assembly, each by a flyer which draws wire from a source thereof and rotates about an axis that intersects the axis of the armature core gripping means, wherein said lead attaching instrumentalities, including the common mounting structure thereof, said control signal producing means, and said signal controlled drive means are duplicated, with one of each associated with each flyer, wherein the hub portions of the two common mounting structures are coaxial and rotatable relative to one another, and wherein said two signal controlled drive means function independently of one another.

* * * * *